Aug. 14, 1934.  W. H. GRAVES  1,970,088
METHOD OF OPERATING INTERNAL COMBUSTION ENGINES
Filed Feb. 20, 1931
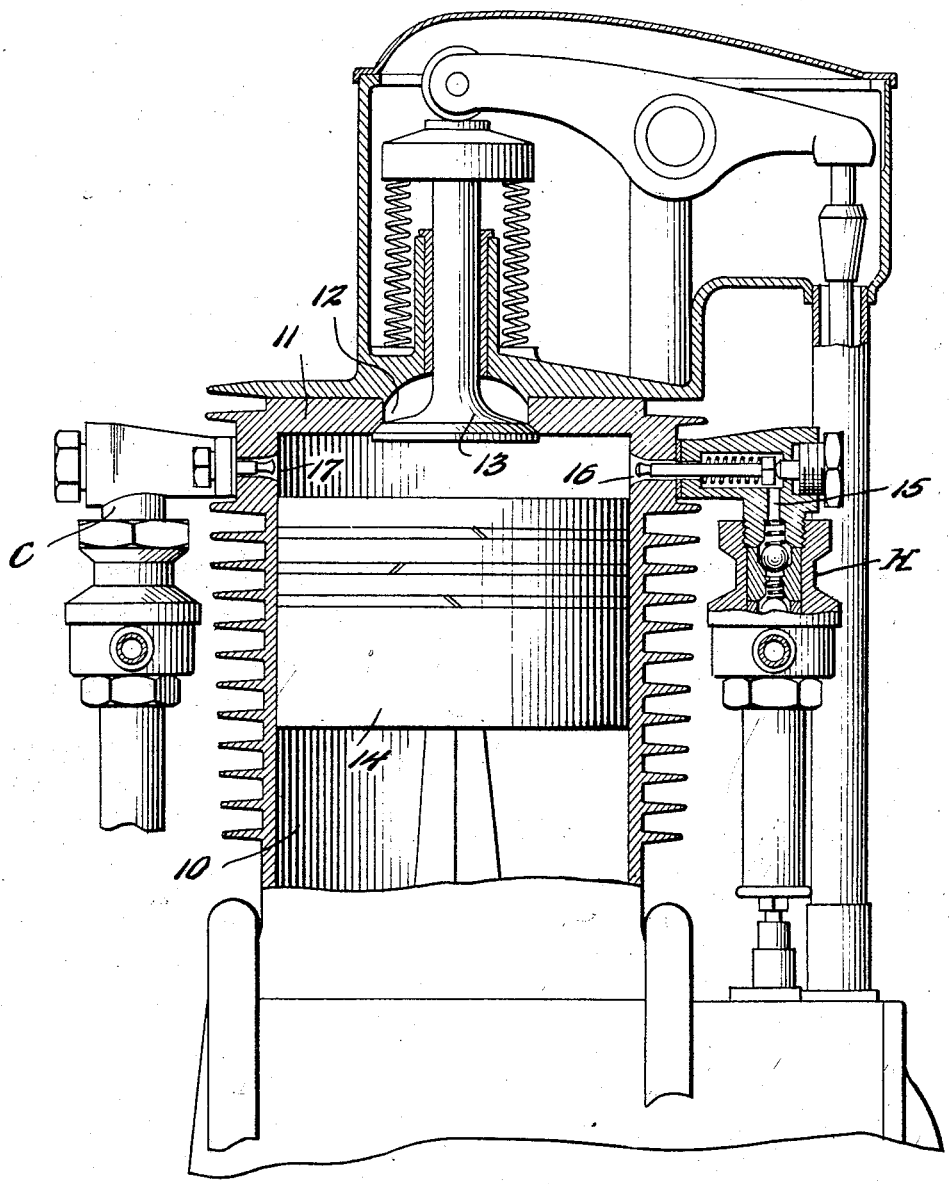
Inventor
William H. Graves
By Watson, Cott, Morse & Grindle
Attorneys Patented Aug. 14, 1934

1,970,088

UNITED STATES PATENT OFFICE 1,970,088

METHOD OF OPERATING INTERNAL COMBUSTION ENGINES

William H. Graves, Detroit, Mich., assignor to Packard Motor Car Company, Detroit, Mich., a corporation of Michigan Application February 20, 1931, Serial No. 517,291

1 Claim. (Cl. 123—180)

The present invention relates to methods of operating internal combustion engines, and particularly to methods of initiating the operation of internal combustion engines of the compression-ignition type.

Diesel engines have demonstrated their capacity to perform efficiently over long periods of time at relatively small expense and are now coming into widespread use, not only as stationary engines but as power plants for motor vehicles, rail cars, and aircraft. As is well-known, such engines are not provided with sparking devices to effect the ignition of the combustible charges, but each charge is actually ignited by the heat developed as a result of the compression of the air or other gas in a cylinder upon the compression stroke of the associated piston. It has been found difficult to start engines of this type in cold weather, after the engine has been idle for some time and the cylinder walls and cylinder heads have become quite cool. This starting difficulty has sometimes been annoying to Diesel engine operators, particularly where the engines are used as the power plants of aircraft which are called upon to operate at low winter temperatures.

In accordance with the present invention, an improved method of initiating the operation of an internal combustion engine of the Diesel type is provided whereby the operator is enabled to readily start the engine when it is quite cold, and without the necessity of any special warming-up operation or excessive "cranking", such as now generally found necessary.

In accordance with my improved method, I form in each engine cylinder, in any suitable manner and by the use of any suitable means, an explosive charge consisting of a mixture of a substance having a low autogenous ignition temperature and air, such for instance as a mixture of carbon disulphide and air. A fuel having a low autogenous ignition temperature is one which will spontaneously ignite at a relatively low temperature. A fuel of this character, within the import of the present invention, is one which will spontaneously ignite without fail when injected into air at atmospheric pressure having a temperature of 450° F. or less. Carbon disulphide atomizes readily, and its ignition point is relatively low. Upon the occurrence of the compression stroke of the piston, the mixture of carbon disulphide, vapor, and air is highly compressed and easily reaches the temperature of ignition. Upon ignition, the usual working stroke of the piston occurs, and the cylinder is thereafter cleared of the waste products of combustion. After one or more working strokes of the piston have been completed, the supply of carbon disulphide is cut off, and the engine is supplied thereafter only with the hydrocarbon fuel which it is designed to consume under normal conditions.

I have found that by first supplying carbon disulphide and air in this manner to the cylinders of an internal combustion engine of the Diesel type, it may be instantly brought into initial operation and that, because of the fact that the inertia of the moving parts of the engine is overcome by these initial explosions and also because of the fact that the cylinder walls and head are at least partially warmed, the engine will readily continue its operation even though supplied with relatively low-grade fuel.

The novel method may be carried out in various ways, and the mechanical apparatus provided to supply the cylinders with the carbon disulphide may be of any desired type. In the accompanying drawing a cylinder of an internal combustion engine of the Diesel type is illustrated, together with means for supplying the carbon disulphide and the means for supplying the hydrocarbon fuel which is principally used, but it will be understood that the structure illustrated is set forth by way of example only and that the novel method may be carried out in engines which vary widely in type and design, the means for supplying the carbon disulphide and the hydrocarbon fuel being varied to suit engine structure and operating conditions.

An engine cylinder is indicated at 10 and the cylinder head at 11, in the present instance these members being formed in one integral piece. An aperture 12 in the head of the cylinder is controlled by valve 13, and in the operation of the engine the port 12 serves both for the inlet of combustion supporting air and the outlet of spent products of combustion. The valve operating mechanism may be of any suitable type. A piston is indicated at 14, this piston being of any desired construction. It will be understood that the engine itself may have one or more cylinders and may be air or water-cooled as desired.

Secured to one cylinder wall at a point just below the head 11 is an injector generally indicated at H. This injector is of the plunger type having a reciprocating plunger (not illustrated) intended to intermittently inject hydrocarbon fuel into the combustion space of the cylinder, fuel passing in measured charges through the fuel conduit 15 and being intermittently sprayed into the cylinder through the fuel discharge port 16. On the opposite side of the cylinder is a similar fuel injection device generally indicated at C, and this injection device is primarily provided for the purpose of introducing into the combustion space measured quantities of carbon disulphide or other fuel of low autogenous ignition temperature, such liquid being intermittently discharged into the cylinder through port 17.

The fuel injection devices may be actuated in various ways. I may provide means for holding either or both of them out of operation, which means is under the control of the operator, so that when the engine is first "cranked", the hydrocarbon fuel injector H is inoperative, and the carbon disulphide fuel injector C is operative. Control mechanism of this kind may be actuated, after one or more initial explosions have been had, to interrupt the flow of carbon disulphide and to initiate the intermittent flow of hydrocarbon fuel.

On the other hand, the hydrocarbon fuel injector may be permanently operatively connected to the crankshaft of the engine or other engine-driven part so that it functions at all times and the carbon disulphide injector C alone controlled by the operator. It is found that, where a hydrocarbon fuel injection device of this nature is utilized, a considerable quantity of air collects in the injector when the engine has been out of operation for a substantial length of time so that, when the engine is "cranked", one or two operations of the injector are required to eliminate the air therefrom, the result being that hydrocarbon fuel is normally not discharged into the cylinder in material amounts until the crankshaft has made several turns in the cranking operation.

The injector C for the fuel of low autogenous ignition temperature, however, is so arranged that it functions immediately, as soon as the crankshaft starts to rotate, to inject this liquid into the cylinder. If desired, it may even be so designed that it may be caused to operate prior to the cranking so that, as soon as cranking is commenced, an explosion will occur. It will be understood that any means may be adopted whereby an explosive charge comprising carbon disulphide and air is formed in the cylinder in advance of the discharge into the same cylinder of hydrocarbon fuel in substantial quantities. The benefits of the invention will not be lost naturally if small quantities of hydrocarbon fuel are introduced with the necessary quantities of carbon disulphide, but it is undesirable to have substantial quantities of the hydrocarbon fuel enter the cylinder at or about the same time the carbon disulphide is introduced in the cylinder as the mixture cannot be as easily ignited as can the carbon disulphide alone.

Having thus described the invention, what is claimed as new and desired to be secured by Letters Patent is:—

The method of initiating the operation of an internal combustion engine of the compression-ignition type and in which the combustion chamber has too low a temperature to permit the ignition, by compression alone, of ordinary fuels, which comprises introducing into such combustion chamber a charge consisting substantially wholly of carbon disulphide and air, effecting the ignition of such charge wholly by compression, and introducing and igniting by compression such further similar charges, while the engine remains substantially free of load, as are necessary to raise the temperature of the combustion chamber to the point where ordinary fuels may be ignited by compression alone.

WILLIAM H. GRAVES.